United States Patent [19]

Mason

[11] 4,034,568

[45] July 12, 1977

[54] UNDERWATER CLAMPING MECHANISM

[76] Inventor: Burton Hoster Mason, Box 504, Covington, La. 70433

[21] Appl. No.: 640,013

[22] Filed: Dec. 12, 1975

[51] Int. Cl.² ........................................ B63C 11/40
[52] U.S. Cl. .............................. 61/69 R; 114/16 R; 214/1 CM
[58] Field of Search ................ 61/69 R, 72.1, 72.3, 61/72.4, 63; 214/1 RCM; 166/.5, .6; 294/66 R, 118; 114/50, 51, 16 R

[56] References Cited

U.S. PATENT DOCUMENTS

| | | | |
|---|---|---|---|
| 1,385,682 | 7/1921 | Haynie | 61/69 R |
| 1,422,765 | 7/1922 | Johnson | 294/118 X |
| 2,229,359 | 1/1941 | York | 294/118 |
| 3,367,299 | 2/1968 | Sayre | 114/51 |
| 3,621,911 | 11/1971 | Baker | 166/.5 |
| 3,709,550 | 10/1973 | Mitchell | 294/118 |
| 3,722,941 | 3/1973 | Seiple et al. | 294/66 R |
| 3,736,018 | 5/1973 | Sayre et al. | 294/66 R X |
| 3,759,563 | 9/1973 | Kitamura | 61/69 R X |
| 3,851,491 | 12/1974 | Mason | 61/69 R |
| 3,927,636 | 12/1975 | Childers et al. | 294/66 R X |

*Primary Examiner*—Dennis L. Taylor
*Attorney, Agent, or Firm*—Marvin Feldman; Stephen E. Feldman

[57] ABSTRACT

A clamp engages an object such as a pipe at an undersea location and the clamp is connected by a wire to a surface station. At the upper end of the clamp is a mechanism for operating the clamp and this mechanism is provided with a seat for receiving a clamp arm of a manned submergible chamber. The manned submergible chamber grips the clamp mechanism and working in conjunction with the surface station closes the clamp on the pipe, and then after disengaging the work arm, the clamped pipe is brought to the surface station. The mechanism of this invention is particularly suited to offshore drilling operations as well as salvage operations. In another embodiment a hook is guided by the work arm to an object such as a pad eye and the hook engages the pad eye by the movement of the work arm. Once the pad eye is hooked the wire takes the hooked object to the surface.

2 Claims, 3 Drawing Figures

UNDERWATER CLAMPING MECHANISM

This invention relates to an underwater clamp mechanism. Specifically this invention relates to a mechanism which cooperatively utilizes submergible chamber apparatus and surface station apparatus for removing objects at undersea locations.

Heretofore it was known to lower a clamp from a surface vessel to engage a pipe and take the pipe up by remote operations on the surface vessel. Such operations were undesirable in that it was often difficult if not impossible for the surface operator to accurately position and actuate the pipe clamp. This was particularly so in depths ranging from several hundred feet up to several thousand feet.

It was also known in the prior art that certain submergible vessels could be provided with a manipulator arm for picking up objects from undersea locations. These manipulator arms were limited in the size and weight of the object they could engage and carry to the surface and were generally limited to use for objects of limited size or for obtaining oceanographic samples.

It was also known in the prior art to employ divers for assisting in the clamping operation but the use of divers is often considered hazardous and prohibitive at depths ranging from several hundred feet to several thousand feet.

Now there is provided by the present invention, a mechanism for clamping onto objects such as a drilling pipe, and the like and removing the objects from a subsea work area, wherein the submergible chamber apparatus and surface station apparatus are interconnected by said mechanism and cooperatively operated for clamping and removing the pipe.

It is therefore an object of this invention to provide an apparatus for clamping onto and removing an object from a subsea location wherein the clamping operation is controlled at the subsea station.

It is a further object of this invention to provide a clamping apparatus as aforesaid wherein the clamp arm of a manned submergible chamber and the surface connected wire are interconnected by said apparatus and cooperatively operated for clamping and removing the pipe to the surface.

It is still a further object of the invention to provide a clamping apparatus as aforesaid which is operable in depths of several hundred to several thousand feet without the assistance of divers.

It is still a further object of this invention to provide an apparatus as aforesaid in which a clamp arm extending outwardly from a submergible chamber may be readily connected to and operatively seated on said appratus.

The aforesaid as well as other objects and advantages which will become apparent in a reading of the construction and operation as more fully described hereinafter and claimed, reference being had to the accompanying drawings forming a part hereof, and in which:

Figure 1:
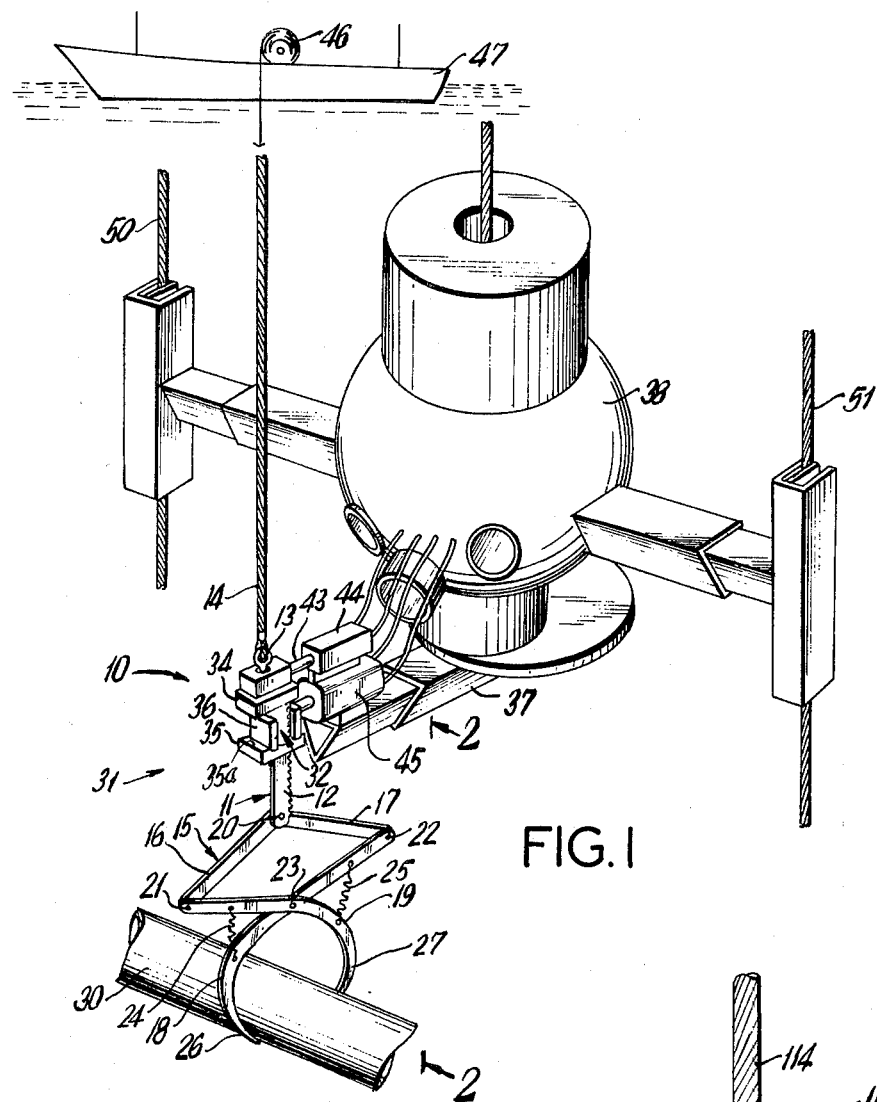
FIG. 1 is a perspective view of the mechanism of this invention in operation at a subsea location.
Figure 2:
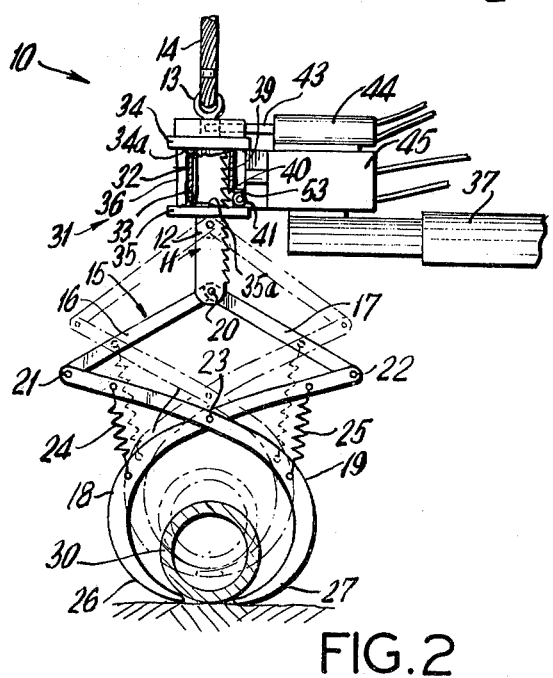
FIG. 2 is an elevational sectional view taken along line 2—2 of FIG.1.

Referring to FIGS. 1 and 2 there is shown the apparatus of this invention designated generally as 10, comprising a first member 11 having a shank portion 12 formed with an eye 13 at the upper end of shank portion 12 for attaching lift wire 14, and being formed with a pivoted clamp 15 at the lower end of shank portion 12. Clamp 15 comprises a series of interpivoted tongs, 16, 17, 18 and 18, pivoted on pins 20, 21, 22 and 23 as shown. A pair of spring 24 and 25, and mounted between tongs 18 and 19 on opposite sides of pivot pin 23. Said springs 24 and 25 exert a modest spring force of from about 10 to 40 psi to keep the opposed tongs 18 and 19 apart before clamping is actuated.

At the free ends of tongs 18 and 19, there are formed blades 26 and 27 respectively, which are in sliding engagement in the clamping of an object such as pipe 30 so that when clamped, pipe 30 is encompassed between tongs 18 and 19 and is in tight pressing engagement therewith. The broken line construction of FIG. 2 depicts the clamping mode. The tongs of course pivot together to the closed position as is also depicted in the broken line construction.

To actuate the clamp to the closed position, a second member 31 is formed with a bushing 32 so that shank 12 is slidably disposed therein. Member 31 is formed with an external cylindrical surface 33, and integral upper flange 34, and lower flange 35. Cylindrical surface 33 and flange surfaces 34a and 35a form a seat for clamp 36 actuated by clamp cylinder 45 of work arm 37 of submergible chamber 38 for purposes hereinafter appearing.

Further, shank 12 is formed with a series of teeth 39. A ratchet 40 is pivotally mounted on second member 31, and is spring loaded by spring 41. Ratchet 40 is formed to interengage teeth 39, so that with the vertical upward movement of shank 12 (by the force exerted by connected lift wire 14), the ratchet prevents return movement or lowering of shank 12.

Shank 12 is also formed with a hole 42 for receiving pin 43. Pin 43 is retractably extensibly actuated by hydraulic piston 44 which is mounted on the top of clamp cylinder 45, which in turn is mounted to retractably extensible work arm 37. With pin 43 engaged in hole 42, the first and second members are fixedly held to one another through the interconnection of clamp 36 clamped on the seat of the second member.

Lift wire 14 is attached to a winch 46 mounted on surface vessel 47 which permits paying out or taking up of wire 14.

In this manner of construction, at or near the surface, pin 43 is inserted in hole 42 and clamp 36 is closed on the seat of the second member. The chamber 38 with attached clamping mechanism 10 is then lowered to the appropriate undersea location. The chamber 38 is then fixedly held at the location adjacent the pipe 30, by gripping the guide wire 50 and 51 in the manner more fully described in U.S. Pat. No 3,851,491. With the chamber held in place, the chamber operator actuates movement of work arm 37 until the clamp 15 is over the pipe. Pin 43 is then disengaged from hole 42 and the tong blades 26 and 27 engage the pipe. Lift wire 14 is then taken up so that shank 12 passes upwardly within bushing 32, and ratchet 40 engages in series the teeth 39 so as to prevent lowering of the shank.

With the continued upward movement of the shank 12, and engagement of the clamp 15 with the pipe 30, the clamp tongs continue to pivot until the clamp pressingly engages the pipe in the closed position, or as fully closed as the pipe permits. The ratchet holds the shank from downward travel so as to reopen the clamp.

The chamber operator signals the winch operator at surface vessel to maintain a constant strain on wire 14, and the chamber operator actuates open the work arm clamp, permitting the clamped object to be taken to the surface.

An acess hole 53 is formed in the second member to permit pivoting of the ratchet, after the object is taken to the surface vessel. This pivoting of the ratchet permits the second member to slide freely upward on the shank and return the first position for the next clamping operation.

Figure 3:
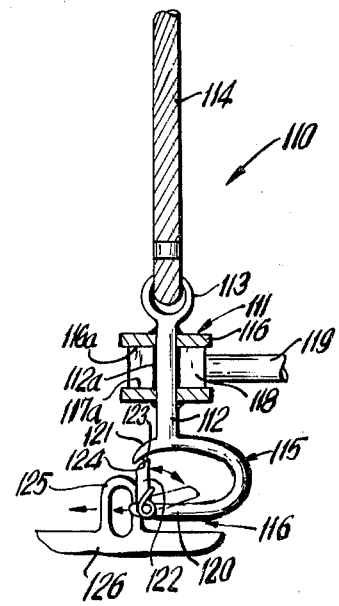
FIG. 3 is a sectional elevational view of another embodiment of the invention.

Referring now to FIG. 3 there is shown another embodiment of the invention generally designated as 110, comprising member 111. Member 111 comprises an intermediate or shank portion 112, an integral upper portion 113 comprising means to attach one end of surface-connected lift wire 114, and an integral lower portion 115 comprises a hook 116. A pair of flanges 116 and 117 are welded to shank portion 112 and said flanges are in parallel spaced disposition. Flange surfaces 116a and 117a, and shank surface 112a form a seat for clamp 118 of work arm 119. Work arm 119 is mounted to a submergible chamber and is retractable as well as being rotatable with respect thereto as more fully described in U.S. Pat. No. 3,851,491. Clamp 118 is operable to grip member 111 in the seat formed by 116a, 117a and 112a, from within the manned chamber.

Hook 116 comprises two parallel arms 120 and 121. Arm 120 is adapted to mount a spring-loaded gate 122. Gate 122 is formed with a flat edge 123 which abuts edge 124 of hook arm 121.

Hook 116, engages an object such as pad eye 125 of object 126 and gate 122 holds the pad eye from leaving the hook in taking the object 126 to the surace. Gate 122 in pivoting provides sufficient clearance to receive the pad eye and then by spring action be returned to the gated position. The broken line construction shows the gate in the full pivoted open position.

In operation, clamp 118 is closed on the seat of member 111 and the chamber attached member with lift wire 114 are lowered to a subsea location. The work arm is then moved by an operator within the chamber so that the hook 116 is aligned adjacent the pad eye and hook 116 engages the pad eye by extension and/or rotation of the work arm. Pad eye 125 forces gate 122 to pivot downwardly and with continued movement of the hook the pad eye slips beyond the gate, and the spring action returns the gate to its closed position. Clamp 118 is then opened by actuating means from within the chamber, and the chamber operator then notifies the surface operator to take up lift wire 114 so as to remove the hooked object 126.

It is also within the contemplation of this invention to bring the chamber or hooked object to the surface with the work arm clamp in the seated position. That is with cooperation of the lift wire winch operator and the manned chamber operator, the manned chamber can assist in bringing the clamped object to the surface. Of course it is most desirable to have the manned chamber remain at the undersea location for as long as possible and perform a series of clamping and/or hooking operations before returning the surface.

Although specific embodiments of the invention have been described, modifications and changes may be made therein without departing from the scope of the invention as defined in the appended claims.

What is claimed is:

1. In combination a submergible chamber having a movable work arm extending outwardly therefrom and means to hold said chamber in fixed relationship at an underwater work location, said movable work arm comprising a clamp, and a clamping mechanism for removing an object from an underwater location comprising a first member having clamp means at one end, and means to attach a surface connected wire at the other end, and a second member being formed with a seat for being engaged by the work arm clamp, so that said seat is non-rotatably secured in said work arm clamp and means for actuating said clamp means, said members being in sliding engagement, further comprising stop means to limit the movement of said first member and the pivoted clamp on the object, whereby the seated work arm guides the clamp means to said object and the clamped object is then taken up to the surface by the wire.

2. A mechanism for removing an object from an underwater location, comprising a clamp, means to attach said clamp to a movable work arm of a submergible chamber, and a clamping mechanism for removing an object from an underwater location comprising a first member clamp means at one end, and means to attach a surface connected wire at the other end, and a second member being formed with a seat for being engaged by the work arm clamp, so that said seat is non-rotatably secured in said work arm clamp and means for actuating said clamp means, said members being in sliding engagement, further comprising stop means to limit the movement of said first member and the pivoted clamp on the object, whereby the seated work arm guides the clamp means to said object and the clamped object is then taken up to the surface by the wire.

* * * * *